F. R. SHOULTZ.
CHICK FEEDER.
APPLICATION FILED JULY 21, 1919.

1,343,093.

Patented June 8, 1920.
3 SHEETS—SHEET 1.

WITNESS:
R. A. Thomas

INVENTOR.
BY F. R. Shoultz
Victor J. Evans
ATTORNEY.

F. R. SHOULTZ.
CHICK FEEDER.
APPLICATION FILED JULY 21, 1919.

1,343,093.

Patented June 8, 1920.
3 SHEETS—SHEET 2.

WITNESS:
F. A. Thomas

INVENTOR.
BY F. R. Shoultz
Victor J. Evans
ATTORNEY.

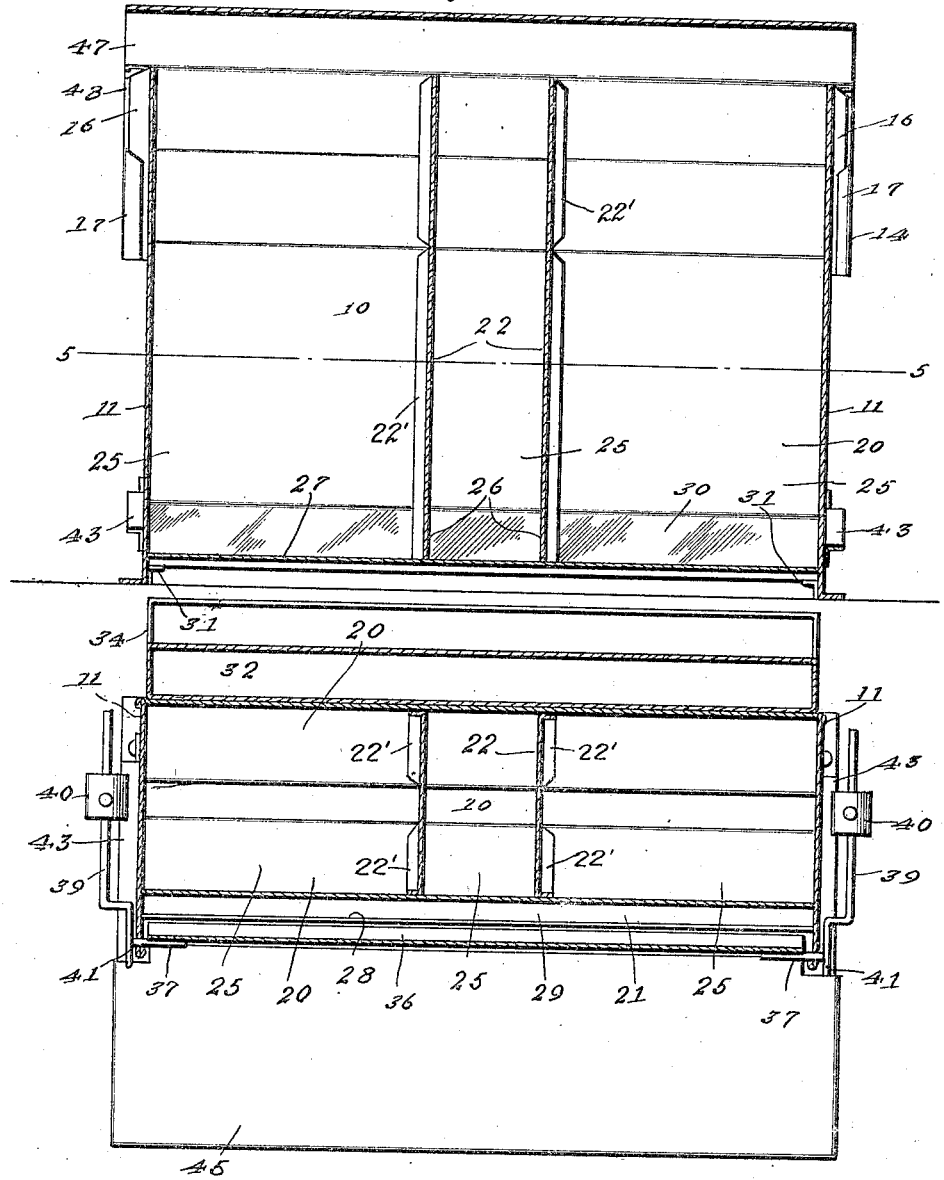

UNITED STATES PATENT OFFICE.

FRED R. SHOULTZ, OF LANSING, MICHIGAN.

CHICK-FEEDER.

1,343,093.         Specification of Letters Patent.         Patented June 8, 1920.

Application filed July 21, 1919. Serial No. 312,202.

*To all whom it may concern:*

Be it known that I, FRED R. SHOULTZ, a citizen of the United States, residing at Lansing, in the county of Ingham and State of Michigan, have invented new and useful Improvements in Chick-Feeders, of which the following is a specification.

This invention has reference to a combined feeding and watering device for poultry.

The improvement is particularly adaptable for small chicks, but may, of course, be used by grown fowls, and has for its primary object to produce a simple, durable and comparatively inexpensive device of this character wherein the feed will be protected from the weather and operated so as to dislcose the feed by the chicks treading upon a suitable platform, the construction being such as to render the contents practically wind-, rain-, rat-, mouse- and bird-proof.

A further object of the invention is to produce a poultry feeder comprising a suitable casing having a removable top and in the said casing is arranged a hopper divided into any desired number of compartments, each containing feed, all of the hoppers delivering to a suitable trough, a weight influenced door normally closing the trough, a pivoted platform being associated with the door whereby weight upon the said platform will cause the door to swing to an open position, and at the same time contact with the side of the hopper to agitate the food therein, the side of the casing opposite that provided with the door and trough being counterbalanced by a gravity feed and water receptacle which also delivers to a suitable trough and which is removably associated with the casing.

The invention further resides in the novel construction, combination and operative arrangement of parts set forth in the following description and falling within the scope of what is claimed.

In the drawings:

Fig. 4 is a sectional view approximately on the line 4—4 of Fig. 3.

Fig. 5 is a horizontal sectional view approximately on the line 5—5 of Fig. 4.

Figure 1:
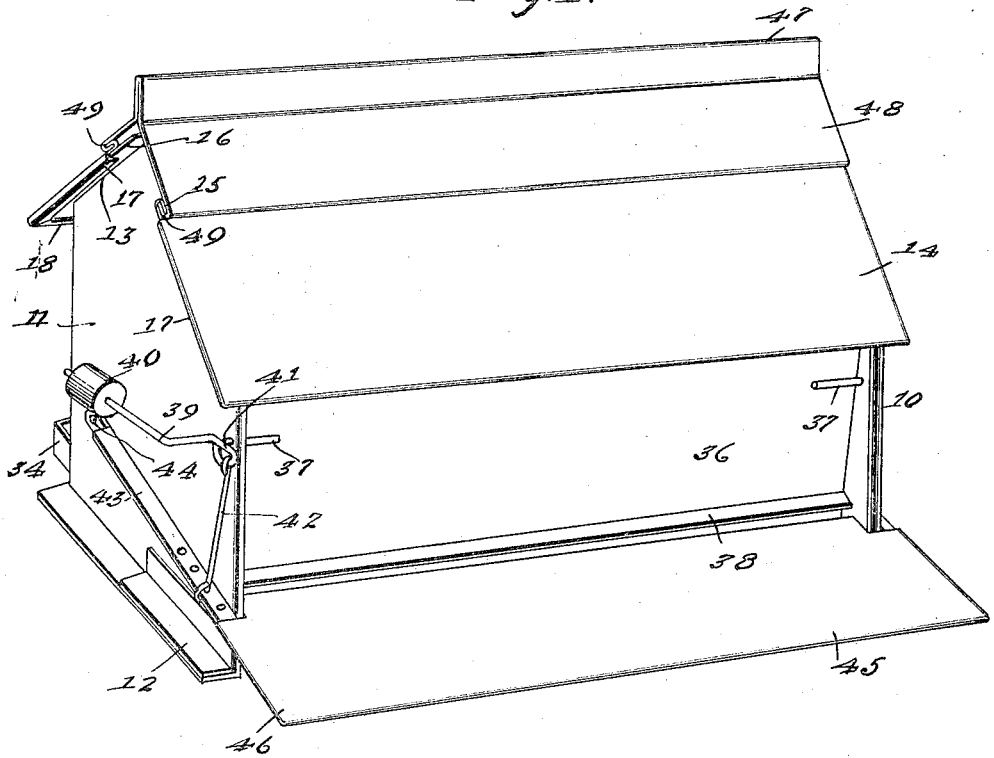
Figure 1 is a perspective view of the improvement.
Figure 6:
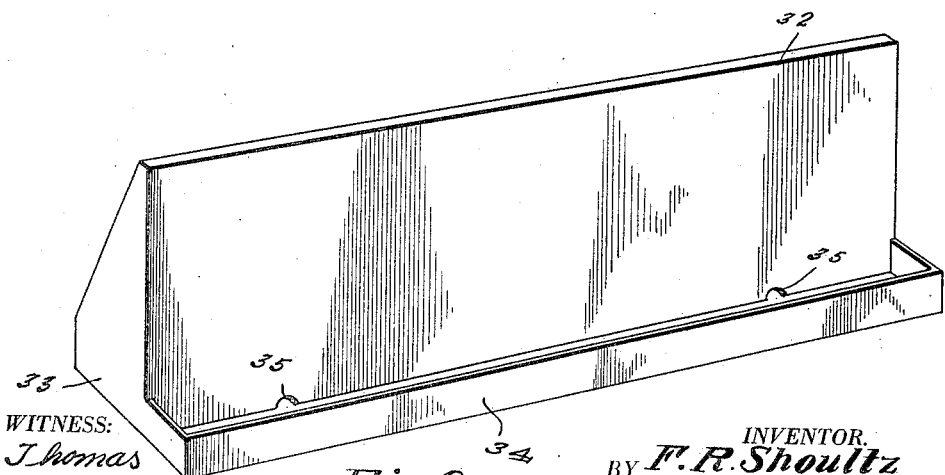
Fig. 6 is a detail perspective view of the removable water receptacle.
Figure 2:
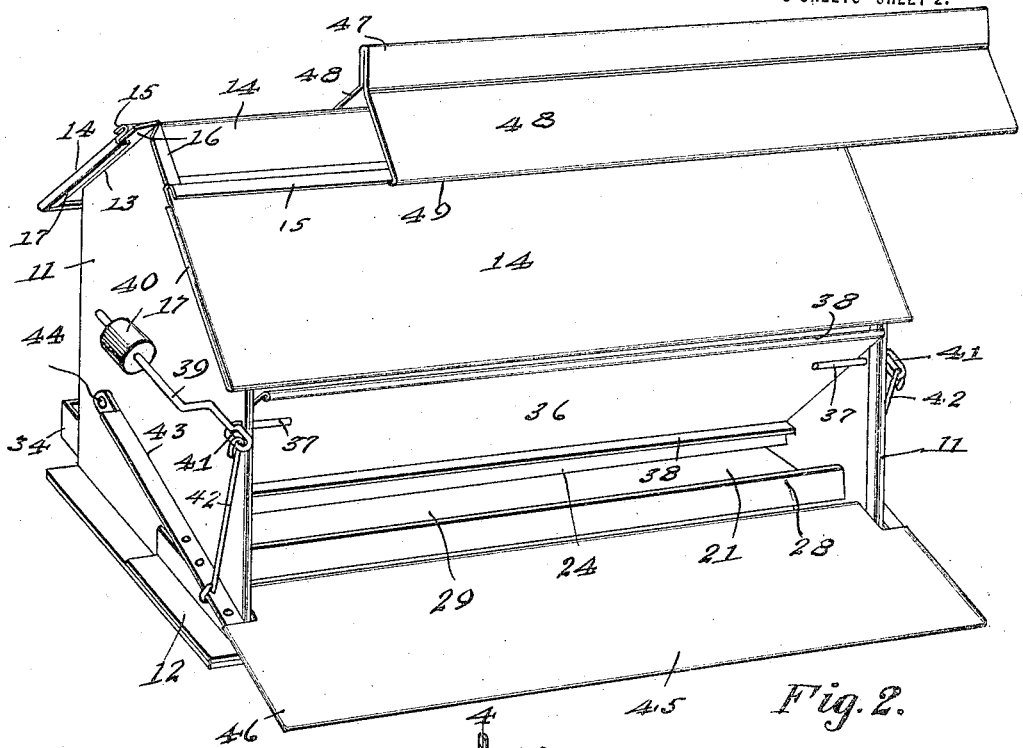
Fig. 2 is a similar view showing the platform depressed to open the door to reveal the feed trough, the slidable and detachable top for the casing being partly removed.
Figure 3:
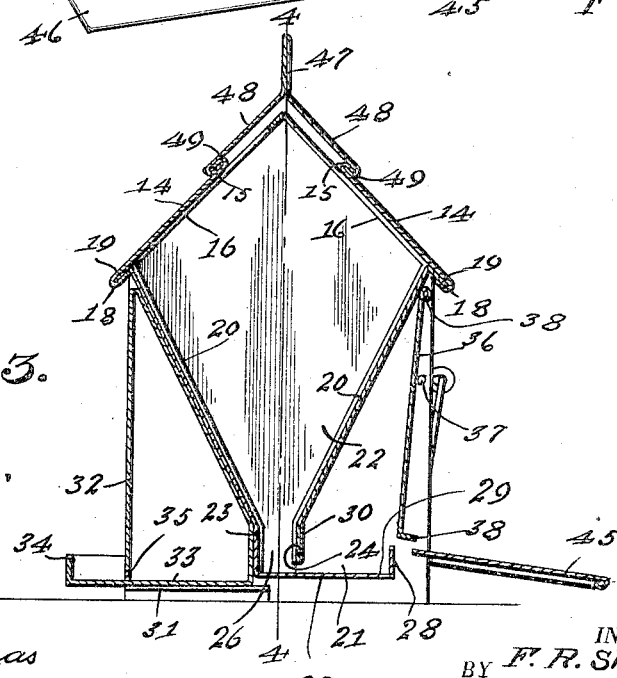
Fig. 3 is a transverse sectional view of the device as illustrated in Fig. 1.

My improvement is preferably constructed of metal or similar resilient material and includes a casing 10. The ends 11 of the casing 10 have preferably secured to their lower edges angle plates 12 which provide the base proper of the casing. The ends 11, at a suitable distance from their upper edges are cut angularly from their side edges to the center of the said upper edges, as indicated by the numerals 13, and at the lower portion of these angle edges are secured plates 14 which form the lower members of the roof. These plates have their upper edges turned upon themselves to provide longitudially extending lips 15. The roof plates project a suitable distance beyond the ends and beyond the front and rear faces of the casing. The angle portions 13 of the end members 11 are flanged outwardly as at 16 to form a more effective means whereby the fixed plates 14 of the roof may be secured thereto and also to provide means whereby the removable section of the roof, presently to be described may find an effective bearing. The lips 15 are disposed outwardly of the roof plates 14, but the ends and lower edges of the said roof plates are turned inwardly to provide inturned lips 17 and 18 respectively. The end lips 17 receive the flanges 16, while the lower lips 18 receive the upper flanged ends 19 of inwardly extending downwardly projected plates 20—20. The ends of these plates are secured to the ends of the casing, and the said plates 20 provide the opposite angle walls of the feed hopper. The feed hopper, broadly indicated by the numeral 21, is divided into any desired number of compartments by transverse partitions 22, the said partitions having their sides flanged and the said flanges 22′ secured to the angle plates 20. The upper edges of the said partitions are arranged angularly to correspond with the upper edges of the ends 11. The plates 20 are either bent upon themselves or formed with straight extensions 23 and 24 that are arranged in parallelism, and these plates provide therebetween the outlet mouth of the hopper and, of course, the outlet mouths of the compartments 25 provided between the partitions 22. In a like manner the partitions 22 have their lower ends provided with straight extensions 26 that are secured to the plates 23 and 24. Preferably, but not necessarily, the plate 23 is integrally formed with the horizontal straight bottom portion 27 of the casing, while the plate 24 is elevated a slight distance above the said bottom plate. The extension 27 of the partitions are also connected to the bottom, and the said bottom is secured to the end members 11 of the casing. The bottom projects a suitable distance outward of the plate 23, and has its end flanged upwardly as at 28, thus providing outward of the hopper a trough 29 which is of a length corresponding to that of the casing, and into this trough the feed gravitates from the compartments. Preferably, and as illustrated by the drawings, the outer face of the plate 23 which forms the inner wall of the trough 29 has a facing of transparent material, indicated by the numeral 30.

It is to be noted that the feed trough 29 is disposed a considerable distance above the angle plates 12 on the ends of the casing. It will be also noted that the construction above described provides a space between what may be termed the rear side of the hopper and the outer edges of the casing, that is, of course, the outer edge of the rear top plate and the edges of the ends of the casing. The ends of the casing in the referred to rear portion thereof are bent upon themselves upwardly and thence inwardly, providing horizontal straight flanges 31 and on these flanges is designed to rest the bottom wall of a water receptacle 32. The water receptacle has its inner wall shaped to correspond with the rear wall of the casing proper, or rather the rear wall of the hopper, the front wall of the water receptacle being straight and terminating only a slight distance above the bottom 33 of the water receptacle. The bottom extends a suitable distance beyond the straight front wall of the water receptacle, having both its outer edge and its sides flanged upwardly and connected together, the side flanges being also connected to the receptacle proper, and this arrangement provides a trough 34 at the lower corner of the water receptacle. The water may be arranged in the receptacle in the well known manner of holding the same and pouring the water into the trough to allow the same to enter the receptacle through the passage 35 provided between the front wall and the bottom of the receptacle, the water being gravity fed to the trough. If desired, any suitable means may be employed for securing the receptacle on the casing, but as the same rests on the flanges 31 and has its upper edge in the path of contact with the eave of the top plate of the receptacle, the same is not liable to be accidentally disconnected from the casing. The receptacle not only serves as a drinking fount but as a counter-balance for the casing 10, particularly when the chicks or poultry place their weight upon the platform which actuates the door to the feed trough, as will presently be described.

The front of the casing 10 including the feed trough 29 is normally closed by a door 36. This door has its ends off its center provided with parallel trunnions 37 that pass through suitable openings in the ends 11 of the casing. The upper and lower edges of the door, which in reality is in the nature of a flat metallic plate, are beaded as indicated by the numerals 38, and the upper bead, when the door is closed normally contacts with the outer plate 20 of the feed hopper 21. Secured to the outer ends of the trunnions are rearwardly extending rods 39. On each of these rods is an adjustable weight 40. The outer end of each of the rods 39 is provided with an eye 41 that receives therethrough the offset end of a link 42. The links have their lower ends secured in any one of a plurality of spaced openings provided in angle plates 43, the said plates being arranged against the outer faces of the ends of the casing 10 and having their rear ends pivotally secured to the said casing as indicated by the numerals 44. The angle plates 43 provide the side members for a platform 45. This platform is also constructed of a plate of metal and has its ends bent to provide beads 46 that receive the upper flanges of the plates 45. The plates 43 extend a suitable distance beyond the front of the casing 10 so that the platform 45 is arranged outward of the casing, but the inner edge thereof is disposed in close proximity to the outer wall of the feed trough 29, this being provided for by notching the inner corners of the platform. It will be apparent that when the weight of the chicks is received on the platform the said platform will be depressed or swung downwardly, thus, through the medium of the links, swinging the weighted rods connected to the trunnions of the door and likewise swinging the door inwardly. The inward swinging of the door will cause the lower bead thereof to contact with the outer plate of the feed hopper, thus agitating the feed in the various compartments to the hopper, causing the same to gravitate into the feed trough. The transparent front of the trough will allow the chicks to readily perceive the grain or other feed delivered to the said trough. When the weight of the chicks is removed from the platform the weighted rods 39 will swing the door to closed position, and in so doing cause the upper bead of the said door to contact with the hopper, and thus again agitate the feed in the hopper.

Feed is delivered to the various compartments of the feed trough through the open top of the casing 10, and the said open top is normally closed by a cover member of a length, of course, equaling that of the lower top plates of the casing. The cover member is preferably constructed of a single sheet of metal centrally bent upon itself to provide a straight crest 47 and the lapping members are bent at opposite outward angles, as indicated by the numerals 48. These angle portions have their lower edges inturned to provide lips 49, and the said lips are designed to co-engage with the lips formed on the upper edges of the lower top plates of the roof portion of the construction. It is, of course, to be understood that the removable roof section is slid longitudinally over the casing when arranged to cover the hopper or to uncover the same.

It is believed from the foregoing, when taken in connection with the drawings that the simplicity of the construction and the advantages thereof will be apparent. It is to be noted that the elements comprising the main portion of the construction have interengaging lips or beads, that the weights for the door may be adjusted so that the platform can be swung to open the door by baby chicks or growing fowls, and it should be stated that while I have illustrated and described a preferred embodiment of the improvement as it now appears to me, such changes as suggest themselves in manufacturing the improvement may be made if desired, it being understood that any contemplated changes are to fall within the scope of what is claimed.

Having thus described the invention, what is claimed as new, is:—

1. A casing having a feed hopper therein which has its side walls inclined inwardly and which is constructed of resilient material, a trough at the lower and delivery end of the hopper extending outward in one direction therefrom, a pivoted door on the casing, weighted means for influencing the same in one direction whereby to normally close the trough and to bring one end of the door in contact with the hopper, a platform extending outwardly from the hopper and pivotally secured to the ends of the casing, a link connection between the platform and the weighted means for the door whereby to influence the latter when weight is imparted on the platform to swing the door to open position to unclose the hopper and to permit the lower edge of the door contacting with the hopper to agitate the feed therein, counter-balancing means comprising a water receptacle removably arranged in the casing at the side thereof opposite that provided with the door.

2. A casing having a hopper therein and a trough at the lower delivery end of the hopper extending in one direction therefrom, said casing having an open top providing a feed inlet for the hopper, a removable closure therefor, a door pivoted to the sides of the hopper, adjustable weight influenced means connected to the door for normally swinging the same to a position to close the trough and for causing one end of the door to contact with the hopper to agitate the feed therein, a platform pivotally connected to the sides of the casing and extending outward from the hopper, link members connecting the platform with the weighted means of the door, and said platform when weight is applied thereon designed to influence the said weighted means of the door to swing the door to a position to uncover the trough and to cause the lower edge of the door to contact with the hopper to further agitate the feed therein.

3. A casing including sides having their upper edges inclined inwardly to the center of the top thereof and the said edges flanged, plates having lipped ends engaging the flanges and forming the lower parts of the top of the casing, said last mentioned plates having their upper edges provided with longitudinal lips, angularly disposed plates in the casing connected to the sides thereof and providing therebetween a feed hopper, said angle plates having lower straight plates providing therebetween the feed outlet for the hopper, a trough connected to one of said plates and spaced from the other plate and extending outwardly beyond the last mentioned plate, partitions in the hopper dividing the same into a plurality of compartments, a door having trunnions passing through openings in the sides of the casing above the trough, rods secured to said trunnions, adjustable weights thereon, a platform pivoted to the sides of the casing disposed adjacent to and extending outwardly from the trough, links connecting the platform to the rods, the opposite edges of the door being in the path of contact with the hopper, and the inner wall of the trough provided by one of the depending plates having a transparent facing, a cross sectionally V-shaped top having the lower edges thereof provided with inturned lips designed to coengage with the lips of the top plates of the casing, and a removable water receptacle having a trough at the lower end thereof received in the casing on the side thereof opposite that provided with the door and serving as a counter-balance to prevent tilting of the trough when weight is deposited on the platform thereof.

In testimony whereof I affix my signature.

FRED R. SHOULTZ.